United States Patent
Tonguz et al.

(10) Patent No.: US 12,387,600 B2
(45) Date of Patent: Aug. 12, 2025

(54) METHODS AND SYSTEMS FOR SELF-ORGANIZED TRAFFIC MANAGEMENT AT INTERSECTIONS USING A DISTRIBUTED AI APPROACH

(71) Applicant: CARNEGIE MELLON UNIVERSITY, Pittsburgh, PA (US)

(72) Inventors: Ozan K. Tonguz, Pittsburgh, PA (US); Rusheng Zhang, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 125 days.

(21) Appl. No.: 16/644,737

(22) PCT Filed: Oct. 5, 2018

(86) PCT No.: PCT/US2018/054504
§ 371 (c)(1),
(2) Date: Mar. 5, 2020

(87) PCT Pub. No.: WO2019/071065
PCT Pub. Date: Apr. 11, 2019

(65) Prior Publication Data
US 2020/0265717 A1    Aug. 20, 2020

Related U.S. Application Data

(60) Provisional application No. 62/606,732, filed on Oct. 5, 2017.

(51) Int. Cl.
*G08G 1/0967* (2006.01)
*G08G 1/07* (2006.01)
(Continued)

(52) U.S. Cl.
CPC ......... *G08G 1/096791* (2013.01); *G08G 1/07* (2013.01); *G08G 1/0965* (2013.01); *G08G 1/162* (2013.01); *H04W 4/46* (2018.02)

(58) Field of Classification Search
CPC .. G08G 1/096791; G08G 1/07; G08G 1/0965; G08G 1/162; H04W 4/46
See application file for complete search history.

(56) References Cited

U.S. PATENT DOCUMENTS 6,366,219 B1    4/2002    Hoummady
8,050,854 B1    11/2011   Chandra et al.
(Continued)

OTHER PUBLICATIONS

Tonguz et al., A self-organizing network approach to priority management at intersections, https://ieeexplore.ieee.org/stamp/stamp.jsp?tp=&arnumber=7498098 (Year: 2017).*
(Continued)

*Primary Examiner* — Angela Y Ortiz
*Assistant Examiner* — Charles Pall
(74) *Attorney, Agent, or Firm* — KDW FIRM PLLC

(57) ABSTRACT

A system and method is presented for providing virtual traffic lights in non-ideal situations in which vehicle-to-vehicle communication between vehicles approaching an intersection may be blocked by buildings or other obstructions at the corners of the intersection. The method, using a distributed artificial intelligence approach, requires that vehicles approaching an intersection, unless receiving a message indicating that another vehicle at the intersection has been declared the lead vehicle for purposes of controlling access to the intersection, must slowdown or stop at the intersection and assume the role of lead vehicle.

19 Claims, 10 Drawing Sheets

(51) Int. Cl.
*G08G 1/0965* (2006.01)
*G08G 1/16* (2006.01)
*H04W 4/46* (2018.01)

(56) References Cited

U.S. PATENT DOCUMENTS

| | | | | |
|---|---|---|---|---|
| 8,054,202 | B1* | 11/2011 | Sikora | G08G 1/087 340/904 |
| 8,761,991 | B1 | 6/2014 | Ferguson et al. | |
| 8,972,159 | B2 | 3/2015 | Ferreira et al. | |
| 10,185,327 | B1* | 1/2019 | Konrardy | G05D 1/247 |
| 2003/0210156 | A1 | 11/2003 | Nishimura | |
| 2004/0230345 | A1* | 11/2004 | Tzamaloukas | H04W 84/005 701/1 |
| 2005/0104745 | A1 | 5/2005 | Bachelder et al. | |
| 2007/0115139 | A1 | 5/2007 | Witte et al. | |
| 2007/0208494 | A1 | 9/2007 | Chapman et al. | |
| 2008/0243388 | A1 | 10/2008 | Eguchi et al. | |
| 2009/0063030 | A1 | 3/2009 | Howarter et al. | |
| 2010/0256852 | A1* | 10/2010 | Mudalige | G08G 1/22 701/24 |
| 2012/0056756 | A1 | 3/2012 | Yester | |
| 2012/0112928 | A1 | 5/2012 | Nishimura et al. | |
| 2013/0116915 | A1 | 5/2013 | Ferreira et al. | |
| 2013/0304364 | A1 | 11/2013 | Miller et al. | |
| 2014/0278029 | A1 | 9/2014 | Tonguz et al. | |
| 2016/0019784 | A1* | 1/2016 | Peri | G08G 1/095 340/917 |
| 2016/0071418 | A1 | 3/2016 | Oshida et al. | |
| 2016/0161271 | A1* | 6/2016 | Okumura | B60W 30/18154 701/25 |
| 2017/0016734 | A1* | 1/2017 | Gupta | B60W 30/00 |
| 2017/0110011 | A1 | 4/2017 | Tonguz et al. | |
| 2017/0256167 | A1 | 9/2017 | Kim et al. | |
| 2019/0061689 | A1* | 2/2019 | Breer | B60R 25/245 |
| 2019/0250639 | A1 | 8/2019 | Xu et al. | |
| 2020/0326203 | A1 | 10/2020 | Lund et al. | |

OTHER PUBLICATIONS

Ferreira et al., "Self-Organized Traffic Control", https://dl.acm.org/doi/pdf/10.1145/1860058.1860077 (Year: 2010) (Year: 2010).*

Nakamurakare et al., "A prototype of Virtual Traffic Lights on Android-based smartphones", https://ieeexplore.ieee.org/stamp/stamp.jsp?tp=&arnumber=6644984 (Year: 2013) (Year: 2013).*

Tonguz et al., A self-organizing network approach to priority management at intersections, https://ieeexplore.ieee.org/stamp/stamp.jsp?tp=&arnumber=7498098 (Year: 2017) (Year: 2017).*

Ferreira et al., "Self-Organized Traffic Control", https://dl.acm.org/doi/pdf/10.1145/1860058.1860077 (Year: 2010).*

Nakamurakare et al., "A prototype of Virtual Traffic Lights on Android-based smartphones", https://ieeexplore.ieee.org/stamp/stamp.jsp?tp=&arnumber=6644984 (Year: 2013).*

N. Fathollahnejad, et al., "On reliability analysis of leader election protocols for virtual traffic lights," 2013 43rd Annual IEEE/IFIP Conference on Dependable Systems and Networks Workshop, Budapest, 2013, pp. 1-12, doi: 10.1109/DSNW.2013.6615529, https://ieeexplore.ieee.org/document/6615529. (Year: 2013).*

W. Viriyasitavat and O. K. Tonguz, "Priority Management of Emergency Vehicles at Intersections Using Self-Organized Traffic Control," 2012 IEEE Vehicular Technology Conference (VTC Fall), Quebec City, QC, Canada, 2012, pp. 1-4, doi: 10.1109/VTCFall2012.6399201. (Year: 2012).*

International Search and Written Opinion for International application No. PCT/US2018/043090, mailed on Oct. 25, 2018, 11 pages.

International Search Report and Written Opinion for International application No. PCT/US2018/054604, mailed on Dec. 21, 2018, 7 pages.

International Search Report and Written Opinion for International application No. PCT/US2018/054504, mailed on Jan. 16, 2019, 11 pages.

* cited by examiner

METHODS AND SYSTEMS FOR SELF-ORGANIZED TRAFFIC MANAGEMENT AT INTERSECTIONS USING A DISTRIBUTED AI APPROACH

RELATED APPLICATIONS

This application is a national phase filing under 35 U.S.C. § 371 claiming the benefit of and priority to International Patent Application No. PCT/US2018/054504, filed on Oct. 5, 2018, which claims the benefit of U.S. Provisional Patent Application No. 62/606,732, filed Oct. 5, 2017. The entire contents of these applications are incorporated herein by reference.

BACKGROUND OF THE INVENTION

Mitigating traffic congestion in big cities is a daunting problem and different solutions to this problem have been proposed. One of the promising approaches is known as Virtual Traffic Lights (VTL). VTL involves using wireless communications for traffic control at intersections. The virtual traffic light solution eliminates the need for expensive traffic light infrastructure at each intersection and brings an indicator of the right-of-way at intersections into each vehicle.

The virtual traffic light solution is especially advantageous in developing countries in which a significant percentage of population lacks access to electric power. In many developing countries, the GDP per capita is very low and most of these countries are very poor. In such developing countries, the percentage of intersections in large cities equipped with traffic signals is very low, as their governments do not have the financial means to install expensive traffic light infrastructure at intersections or enough power to run the traffic signals. Hence, a significant proportion of intersections in urban and suburban areas might not be equipped with traffic signals. Yet, the number of vehicles on both urban and suburban roads is large and growing. In such environments, VTL, with the right mechanisms, could manage traffic flows in a completely self-organized manner without the need for infrastructure-based traffic signals. As such, developing countries could benefit tremendously from a well-designed VTL system. These unfortunate conditions provide a strong motivation for the herein described invention.

Even in relatively richer countries with higher GDP per capita, load shedding in the form of power outages and rolling blackouts are very common. South Africa is an excellent example of this, where power outages enforced by utilities such as ESKOM in the last 3 or 4 years have crippled the operation of traffic lights, thus disrupting the flow of traffic during rush hours and during other times in a major way. Such frequent power outages are common place in many countries in Africa (especially sub-Saharan countries), the Middle-East, and other countries in Asia. Vehicles, however, each have their own source of power and, as such, could enable the successful operation of VTL technology during such power outages.

A virtual traffic light system and method was disclosed in U.S. Pat. No. 8,972,159. In a preferred embodiment, the patented approach leverages the use of vehicle-to-vehicle communication which, in one embodiment, uses Dedicated Short-Range Communications (DSRC) radios mandated by the U.S. Department of Transportation (DoT) in February 2014. The described VTL method is based on a self-organizing network approach to mitigating traffic congestion and its success could revolutionize traffic control in cities in a fundamental way. The same powerful self-organizing network approach was shown to solve several other important problems pertaining to safety and traffic efficiency.

VTL is a completely distributed algorithm and it is based on two important mechanisms:
1. Cluster leader election in each approach of a multi-way intersection having vehicles approaching the intersection; and
2. A VTL leader selection algorithm to select a leader amongst cluster leaders for serving as the controller of the virtual traffic lights.

The method of U.S. Pat. No. 8,972,159 teaches that, when two vehicles are approaching an intersection, the vehicles communicate with each other via a vehicle-to-vehicle communication mechanism to determine which vehicle is farthest from the intersection. The vehicle which determines that it is the farthest from the intersection becomes the VTL leader and yields the right-of-way to vehicles approaching the intersection from orthogonal directions. In other words, the VTL leader gives itself and other vehicles approaching the intersection in the same and opposite directions, a red light indication and gives vehicles approaching the intersection on the crossing street a green light indication.

In large urban areas however, depending on the physical environment in different cities and the types of existing intersections, these requirements may be very difficult to meet in a practical manner in real time. One of the key challenges in meeting the above requirements could be the presence of buildings, high-rises or other obstructions on the corners of intersections which might render vehicle-to-vehicle (V2V) communications difficult, if not impossible.

With no ability to communicate vehicle-to-vehicle while still at a distance from the intersection, the VTL method is unable to establish a VTL leader in time to guarantee avoidance of conflicts between vehicles at the intersection. Note that V2V communication may be possible as the vehicles get closer to the intersection, however, this typically leaves little time for establishing a VTL leader and a right-of-way, and, as a result, vehicles may not be able to stop in time to avoid entering the intersection.

Thus, it is desirable to implement a VTL solution which operates under non-ideal conditions, that is, under conditions wherein vehicle-to-vehicle communications is rendered impossible by obstacles existing on the corners of the intersection.

It is well-known that distributed artificial intelligence (DAI) involves the use of multi-agent systems for solving large-scale and complex problems. More specifically, it involves the cooperation of several agents for decision making, problem solving, reasoning, and complex learning in dynamic and complex environments. DAI is useful for addressing issues such as how a group of agents can be made to cooperate to efficiently solve problems, and how the activities of such a group can be efficiently coordinated.

SUMMARY OF THE INVENTION

In this disclosure, systems, techniques, algorithms and software using a DAI approach are described. This DAI approach utilizes the heavy traffic flows inherent during rush hours to create the required VTL leaders for controlling the right-of-way between all of the approaches of an intersection in a very practical and natural manner. The underlying approach uses a self-organizing network of agents implemented in individual vehicles leading to significant benefits in terms of average commute time. More specifically, the disclosed invention can reduce the average commute time of commuters by up to 23% with respect to intersections equipped with traffic lights.

DETAILED DESCRIPTION

As used herein, the term "orthogonal" when used in reference to roads at an intersection does not require that the roads be at right angles to each other but should be interpreted to mean any number of roads that cross each other at an intersection, wherein vehicles on "orthogonal" roads will collide if reaching the intersection at the same time.

As used herein, the phrase "at an intersection" means that a vehicle is at or close enough to an intersection such that obstructions at the corners of the intersection do not interfere with communication with vehicles at or approaching the intersection from an orthogonal direction.

It can be observed that in urban traffic, when one takes a snapshot of location of vehicles, there is a very high probability of finding vehicles waiting at intersections having a red light. This probability increases during rush hours. The invention disclosed herein leverages this key observation for creating natural VTL lead vehicles as well as ensuring a fail-safe operation for VTL at intersections.

Embodiments of this invention disclosed herein utilize a DAI framework for distributed problem solving. More specifically, methods, systems, and software agents are presented whereby a multi-agent system comprised of agents implemented in different vehicles cooperate to manage traffic at intersections without the need for infrastructure-based traffic lights. For this cooperation to be successful, V2V communications is necessary. More specifically, via V2V communications, a lead vehicle (agent) is selected. The lead vehicle temporarily decides which approaches will have the right-of-way at the intersection and which approaches will have to stop at the intersection.

Using a DAI approach implemented with a self-organizing network, the invention addresses how the communications problem between agent vehicles due to obstructions at the corners of many intersections in densely populated areas of a city can be solved. This, in turn, leads to a new distributed algorithm, disclosed herein, that allows this DAI system to achieve its goal in a cooperative manner, that is, to manage the traffic flows at intersections in an efficient and self-organized manner.

The challenges solved by this invention in the DAI context include, among others, (1) how to carry out communication between agents and interaction of agents, as well as which communication language or protocols should be used; (2) how to ensure the coherency of agents; and (3) how to synthesize the results among a group of "intelligent agents" by formulation, description, decomposition and allocation.

Figure 1:
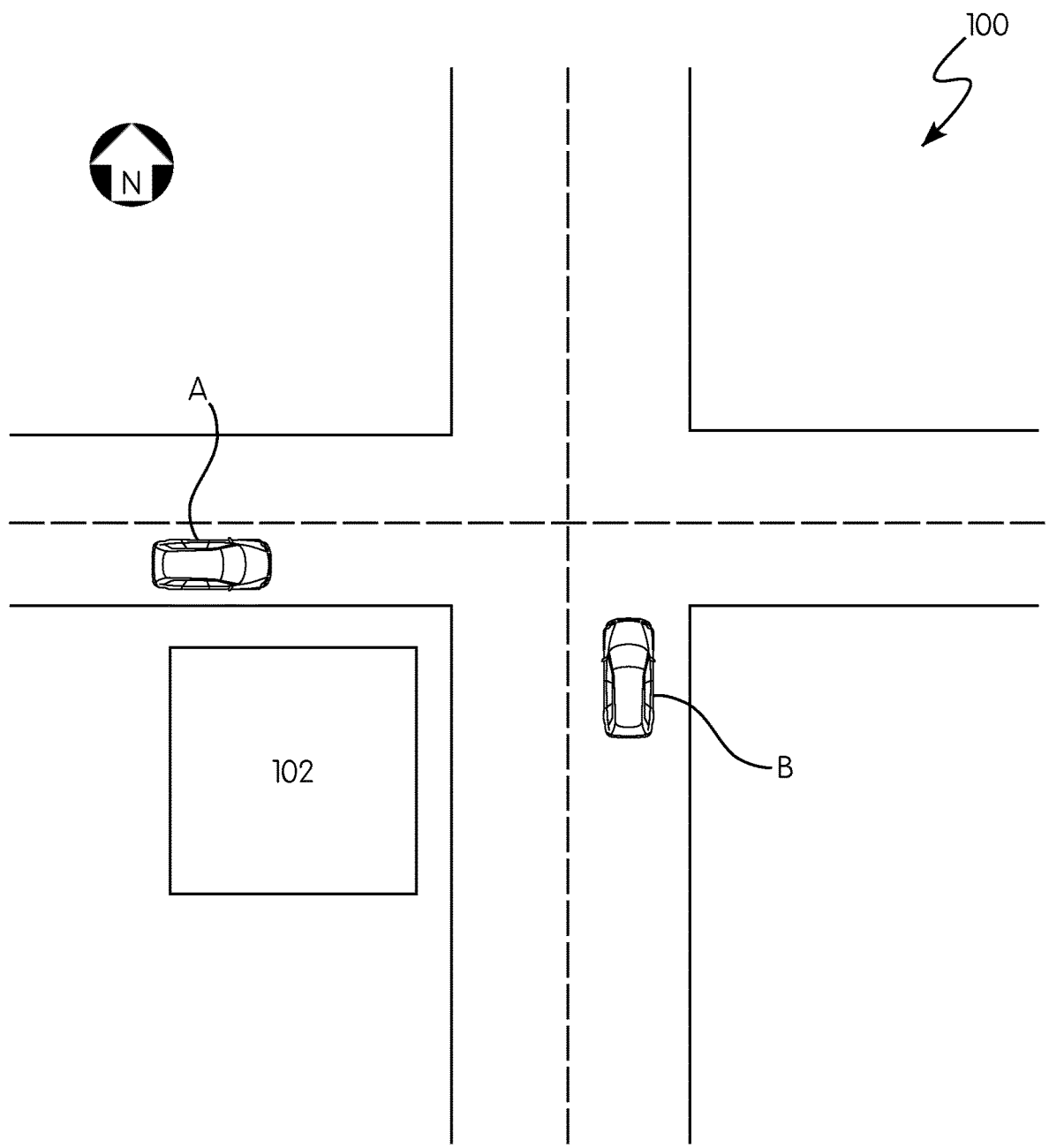
FIG. 1 is a schematic representation of an intersection having an established VTL leader present at the intersection.

The proposed solution can be explained with reference to the figures. FIG. 1 shows an intersection 100 having vehicle B, on the street oriented in the south to north direction, already established as the VTL leader. A vehicle A approaching the intersection on a crossing street listens (by receiving beacon packets from vehicle B via V2V communication) to see if there is a VTL leader at an intersection already. Because vehicle B has already been established as the VTL leader, vehicle A then follows the right-of-way directions of the existing VTL leader, which shows a red light indication to itself and the vehicles in its approach and in the opposite approach, and a green light indication to all vehicles approaching the intersection from either orthogonal direction. Thus, vehicle A would have the right of way in this scenario.

Figure 2:
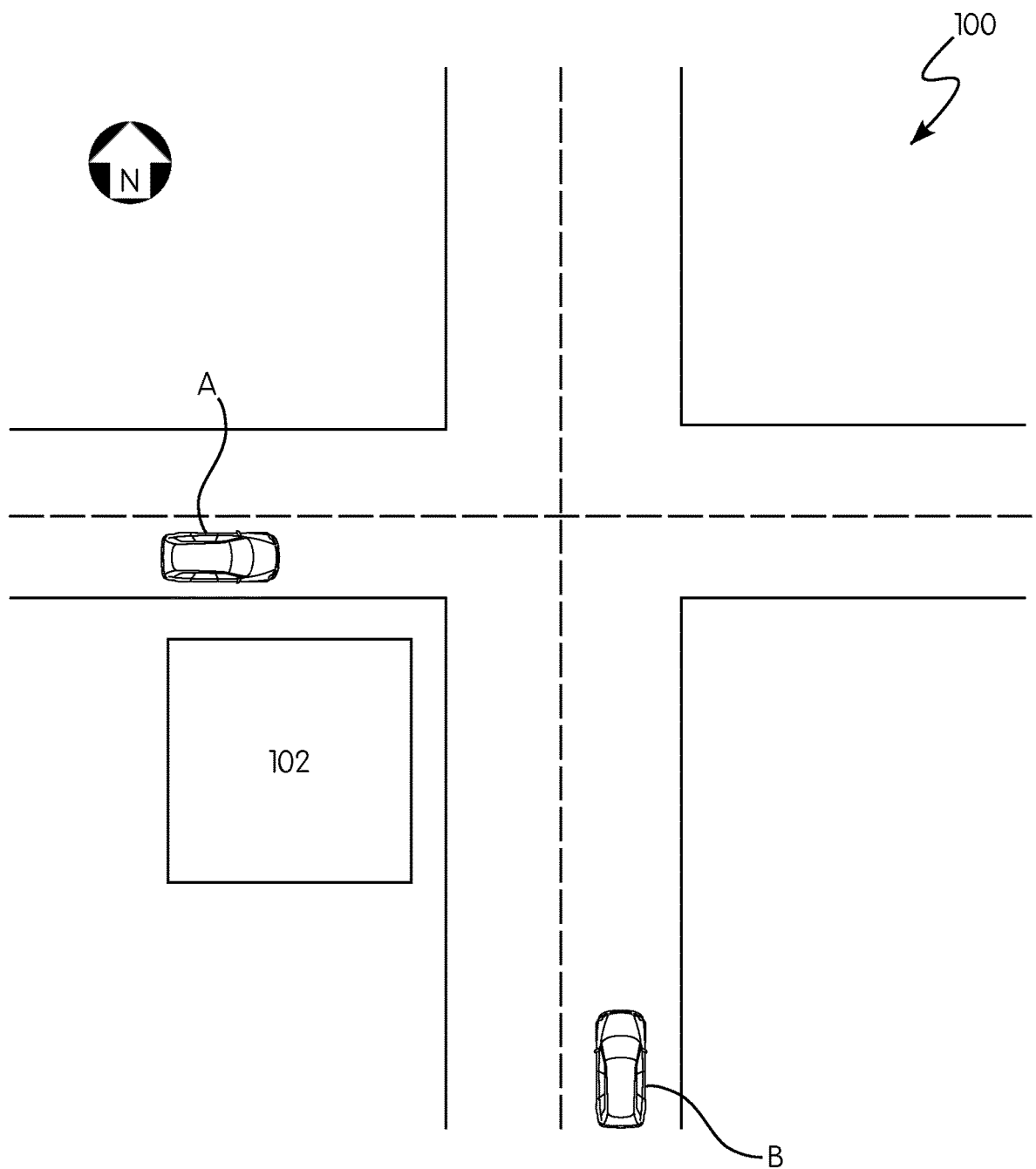
FIG. 2 is a schematic representation of an intersection wherein no VTL leader has been established.

FIG. 2 shows a scenario wherein no vehicle is at the intersection and, as such, no VTL leader has been established. If vehicle A receives no beacon packets, indicating the approach or presence of other vehicles at the intersection, it is likely because the presence of building 102 has blocked communication between vehicle A and vehicle B. Additionally, because no vehicle is stopped at the intersection, neither vehicle A nor vehicle B will receive beacon packets indicating that a VTL leader has already been established. As such, both vehicles A and B will decelerate as they approach the intersection and may display a yellow light indication. The first vehicle to reach the intersection will declare itself the VTL leader and will come to a stop, having a red light indication. Any vehicles approaching from the same or opposite directions will also receive a red light indication, while vehicles approaching from orthogonal directions will receive a green light indication.

Figure 3:
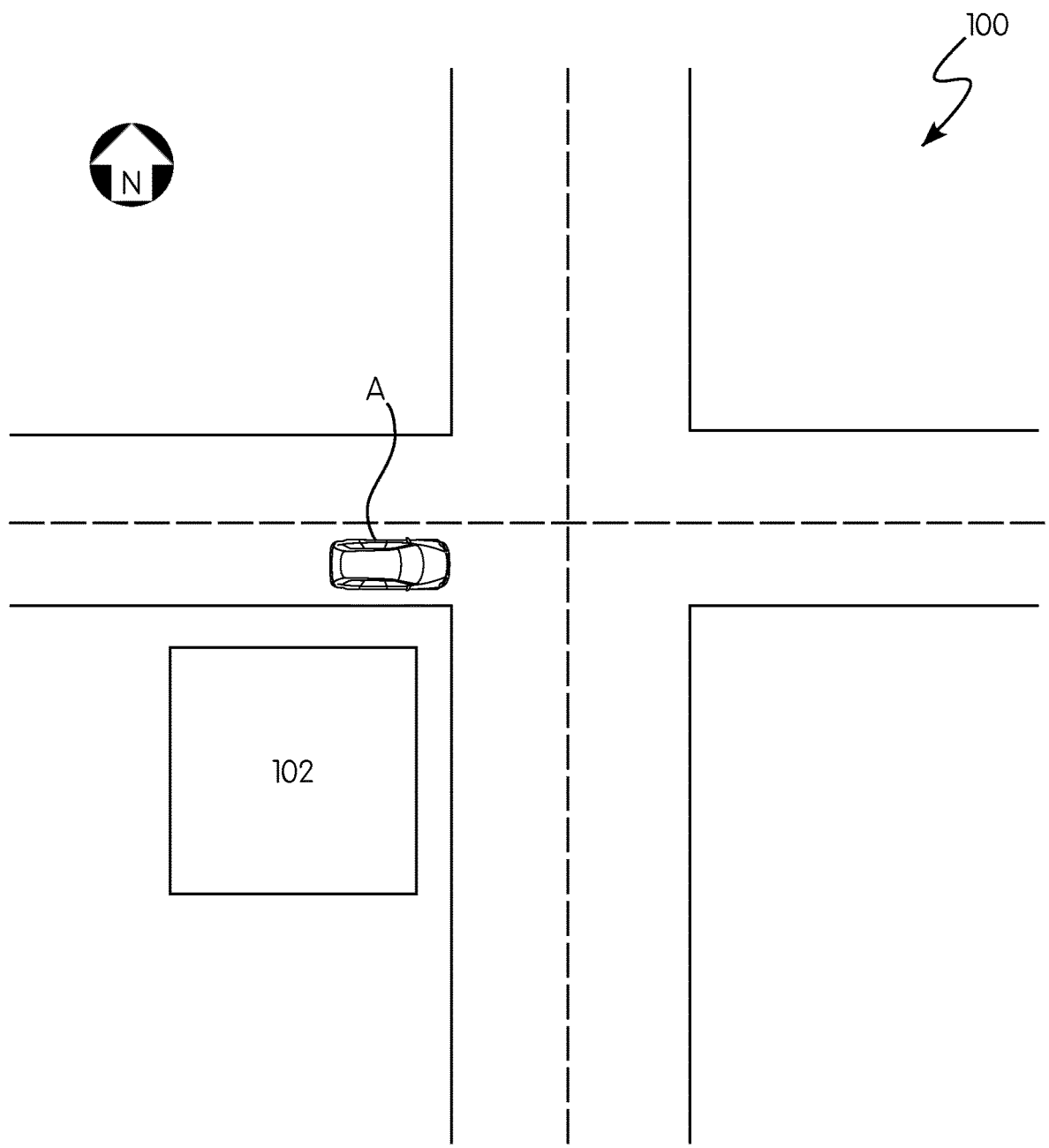
FIG. 3 as a schematic representation of an intersection having a sole vehicle, wherein no VTL leader is necessary.

FIG. 3 shows a situation in which vehicle A, traveling in the west to east direction approaches the intersection and, having received no beacon packets, comes to a stop and declares itself to be the VTL leader. As shown in FIG. 3, because no vehicles are approaching from either the north or south directions, vehicle A will remain at the intersection for only a short time, in the preferred embodiment, on the order of 1 to 2 seconds, before determining that the intersection is clear and it is free to cross, at which time vehicle A will yield the VTL leadership, display a green light indication and obtain the right-of-way to proceed through the intersection.

Figure 4:
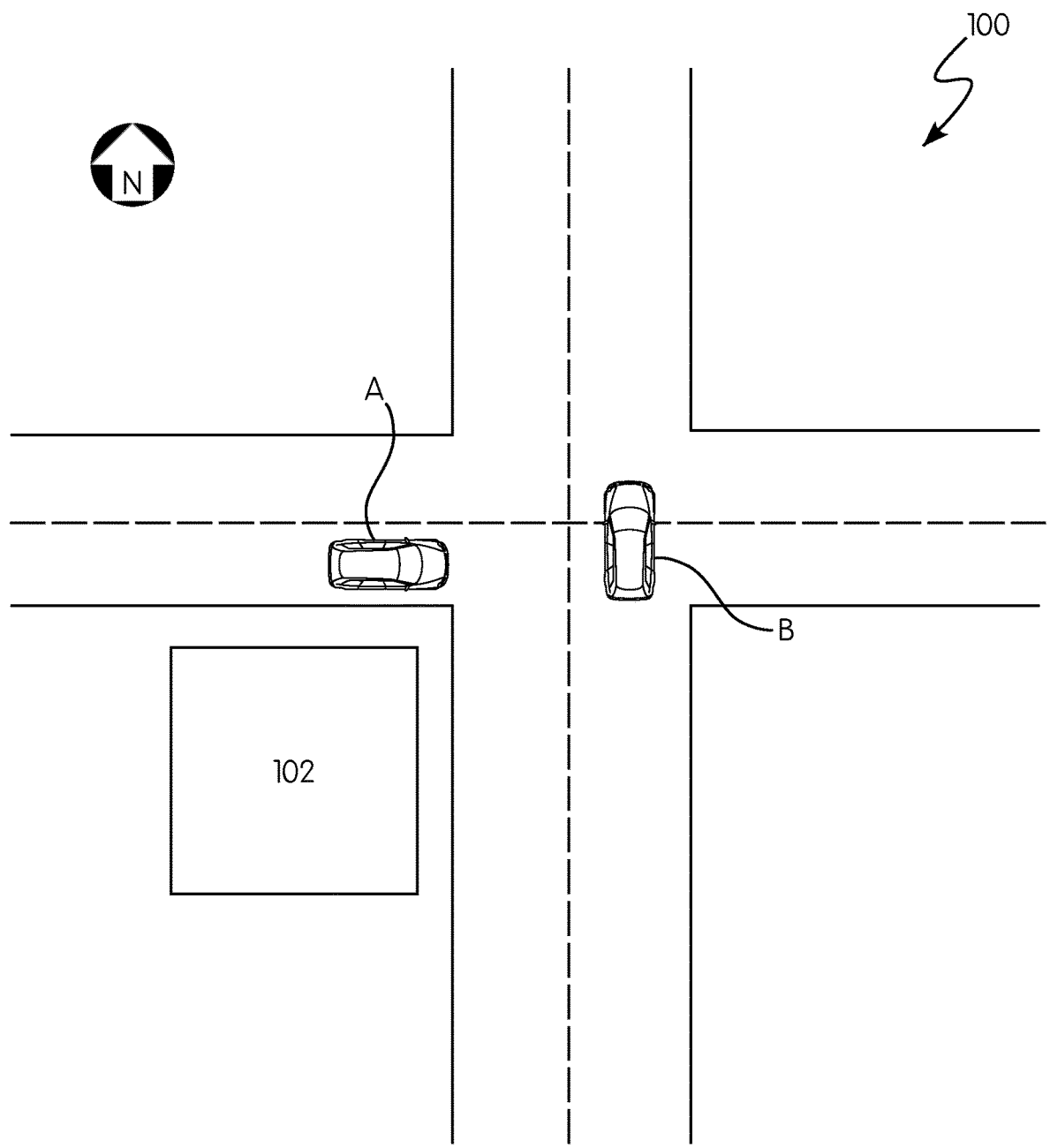
FIG. 4 as a schematic representation of an intersection wherein a vehicle has been selected as VTL leader and further wherein a vehicle traveling in an orthogonal direction has the right-of-way.

FIG. 4 shows a second scenario in which vehicle A has approached the intersection, stopped, and declared itself the VTL leader. In this case, however, vehicle B approaches the intersection in the north direction, and, as soon as the vehicles are able, they will exchange beacon packets. As such, vehicle A knows that vehicle B is approaching the intersection and provides vehicle B with a green light indication (or an indication that vehicle A is the VTL leader, at which time, vehicle B assumes that it has the right-of-way and displays a green light indication), whereupon vehicle B continues through the intersection, while vehicle A, being the selected VTL leader, remains stopped with a red light indication. Once vehicle B has cleared the intersection and, if no other vehicles are detected by vehicle A as approaching the intersection (i.e., vehicle A receives no further beacon packets), then vehicle A will wait for a short time before determining that the intersection is clear and it is safe to proceed therethrough. Vehicle A will then yield the VTL leadership, provide itself with the green light indication and gain the right-of-way to proceed through the intersection. In preferred embodiments of the invention, vehicle A will wait 1 to 2 seconds after receiving last beacon from packet vehicle B (or any other vehicle) to determine that the intersection is clear.

Figure 5:
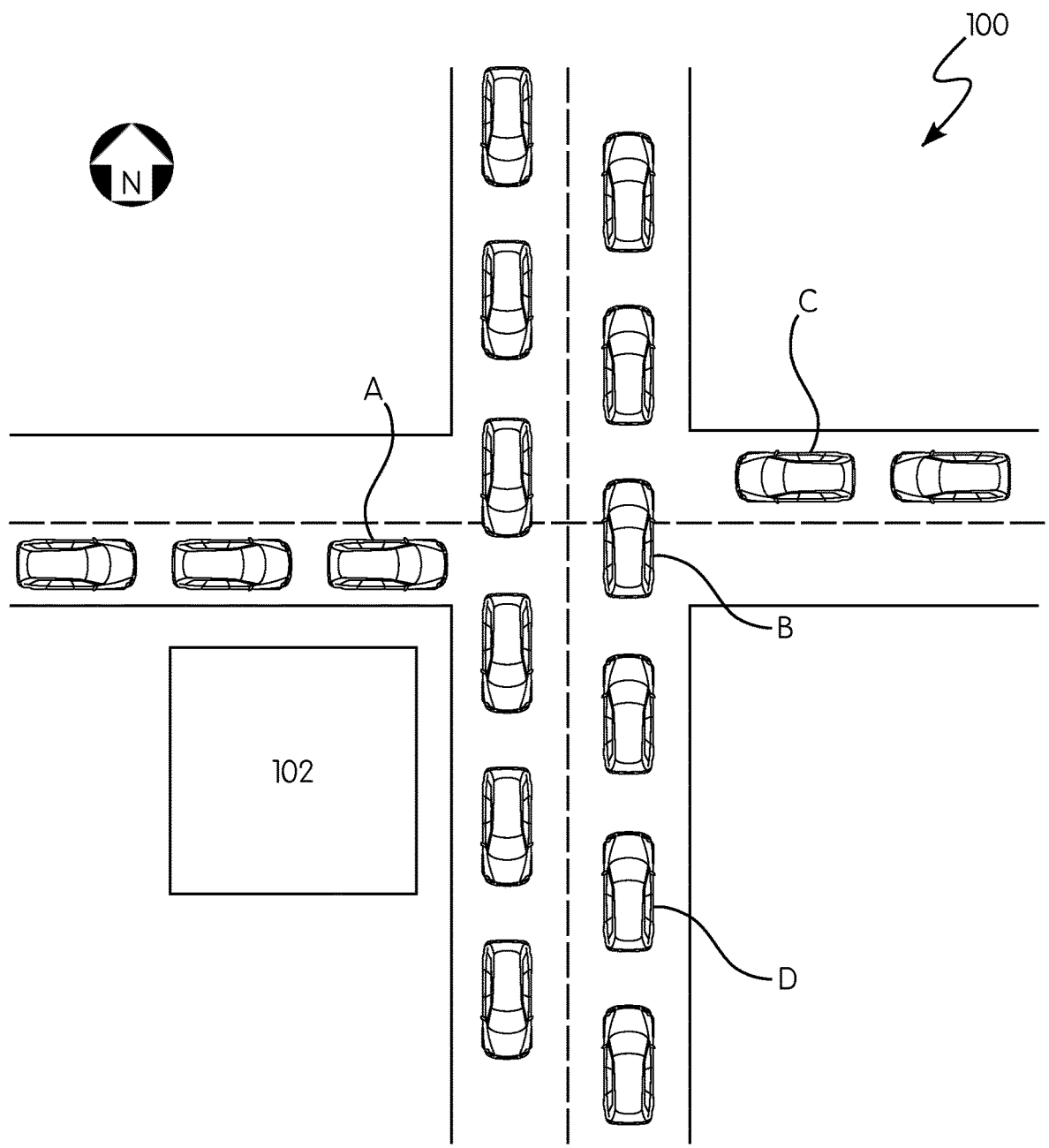
FIG. 5 shows the advantages of the present invention in a very heavy traffic environment.

FIG. 5 shows yet another scenario in which vehicle A is stopped, having a red light indication, and is the VTL leader. The road in the north/south direction is busy. In this scenario, vehicle A will remain the VTL leader for a predetermined period of time and then will pass the VTL leadership to a vehicle approaching the intersection in either the north or south directions, for example, vehicle D, at which time the vehicles traveling in the north or south directions will receive a red light indication, while vehicles traveling in the east and west directions will receive a green light indication.

It should be noted that in periods of high traffic congestion, FIG. 5 is the most likely scenario. It would be unlikely, when approaching an intersection, that a VTL leader is not already established and stopped at the intersection. In such a case, all vehicles traveling in orthogonal directions to the VTL leader will receive a green light indication and all vehicles traveling in the same or opposite directions to the VTL leader will receive red light indications.

Thus, during periods of high traffic congestion, the disclosed method is able to take advantage of the high volume of vehicles, as there is a high probability that there will be a VTL leader present at the intersection. During periods of less congestion, if no VTL leader is at the intersection, as vehicles approach the intersection they will only be required to stop (or slow down) for a very short time, until it can be determined that no vehicles are approaching the intersection from orthogonal directions, at which time they can proceed through the intersection. This eliminates the frustrating scenario wherein vehicles are stopped at a traffic light for a predetermined length of time while no vehicles traverse the intersection in the orthogonal directions.

It should be noted that, as shown in FIG. 5, vehicle A is the cluster leader of the cluster of cars behind it traveling in the same direction as vehicle A, and vehicle C is the cluster leader of the cluster of cars behind it and traveling in the same direction as vehicle C. Thus, vehicles A and C are the leaders of their respective clusters. In one embodiment of the invention only the cluster leaders will participate in the VTL leader selection process, with the other members of each cluster following their respective leaders and displaying the same traffic light indication as their respective leaders.

Figure 6:
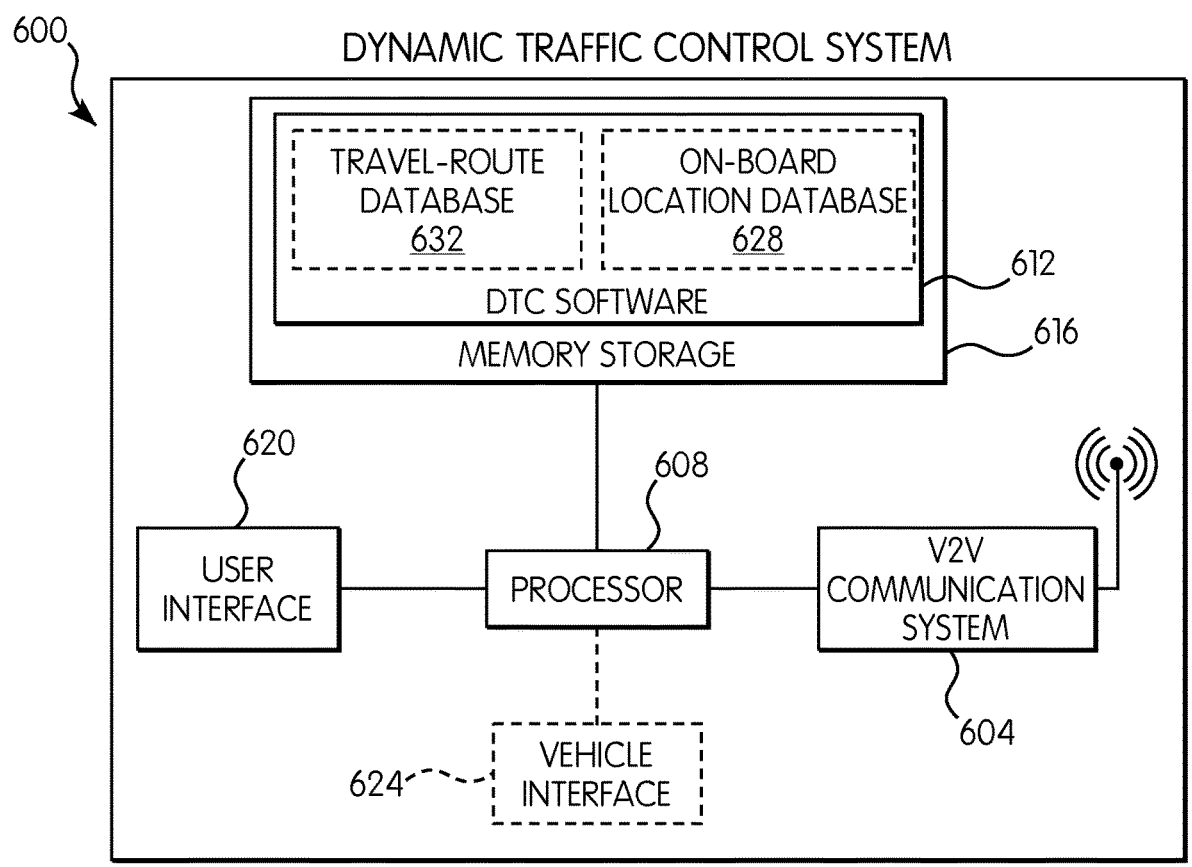
FIG. 6 is a high-level block diagram of a dynamic traffic control system (DTCS).

For a vehicle to participate in the virtual traffic light scenario, it will be necessary for the vehicle to be equipped with a dynamic traffic control system (DTCS), as shown in FIG. 6. It is assumed that, at some point in time, all vehicles will be required to be equipped with such a system.

Referring to FIG. 6, system 600 illustrates a DTC system used to implement the methods described herein. System 600 includes, for example, a vehicle-to-vehicle communications system 604, a processor 608, DTC software 612, a physical memory 616, a user interface 620, and an optional vehicle interface 624. DTC system 600 can also optionally include an on-board location database 628 and/or a travel-route database 632. In alternative embodiment embodiments, the DTCS may use Internet-available geolocation services, such as Google Maps, to provide this information.

DTC system 600 also may require a GPS function, which may be provided by a GPS function built into a smartphone or tablet computing device, a GPS function built into the vehicle-to-vehicle communication system, a GPS function built into the vehicle or an external GPS unit.

In one embodiment of system 600, V2V communications system 604 is designed and configured to send signals to and receive signals, typically in the form of the beacon packet, from one or more other vehicles within the ad-hoc vehicle-based network that have the same or similar DTC. For purposes of the methods described herein, these signals can include at least the current speed of the vehicle and its UPS coordinates. Other information exchanged may include, but is not limited to, acceleration information, information characterizing the type of vehicle, its weight, relevant traffic and road conditions, and the manner of approach of a vehicle, among many others. The beacon packets are periodically broadcast. In preferred embodiments of the invention, beacon packets may be broadcast at 100 ms intervals. V2V communications system 604 is also designed and configured to provide a communications link between vehicles approaching an intersection, as described above, to select a VTL leader and to receive information regarding the type of traffic signal indicator (i.e. a red, yellow or green light indicator) to communicate to the driver of vehicle or in the case of an autonomous vehicle, to inform the autonomous control system for the vehicle.

V2V communications system 604 is designed and configured to transmit and receive signals communicating information using any one or more of a variety of protocols. For example, V2V communications system 604 may broadcast signals periodically from a vehicle through a process known in the art as "beaconing." As part of the beaconing process, the information described above is communicated at regular intervals and throughout a given geographic area surrounding the vehicle. These beaconing signals can be received and/or retransmitted by another DTC system similar to system 600 through V2V system 604.

Furthermore, beaconing signals can be used in cooperation with on-board location database 628. The use of location database 628 with the periodically repeated beaconing signals can permit DTC system 600 to track the location of proximate vehicles. Even further, when location database 628 and beaconing signals are used with travel-route database 632, DTC system 600 can anticipate travel-priority conflict zones because the system is informed of, at the minimum, the location and velocity of proximate vehicle in the context of known travel-routes. In some examples, this can permit DTC system 600 to adapt to local vehicle densities and to anticipate, and accommodate, density trends.

V2V communications system 604 may also be designed and configured to transmit and receive signals using non-beaconing protocols as well, such as signals transmitted to or from another proximate vehicle directly, for example using a handshake, push, or pull protocol, among others. In yet another example, the above-described signals can be communicated between vehicles using a method known in the art as geocasting. In this method, vehicles can communicate with other vehicles regionally proximate but out of range by using intervening vehicles as transponders that propagate the signal. Those skilled in the art will appreciate that beaconing, geocasting, and direct transmission are only exemplars of the many existing techniques that can be used in connection with the teachings of the present disclosure.

In preferred embodiments of the invention, V2V communication system 604 may comprise a dedicated short-range communication (DSRC) radio. In other embodiments, V2V communication system 204 may comprise any other form of wireless communication known or to be developed, including, for example, RFID, Wi-Fi, Wi-Fi Direct, Bluetooth, Zigbee and 4G or 5G cellular communications.

Processor 608 is designed and configured to receive one or more signals from V2V system 604 and initiate an analysis of the information contained in the signals in accordance with the methods disclosed herein. Processor 608, which can include multiple processors operating together, is linked by connections that enable operative communication between V2V communications system 604, physical memory 616, user interface 620, and vehicle interface 624. These connections can include physical connections, such as metal conductors, Ethernet cable, optical fiber, and others well known in the art. Additionally, non-physical connections, such as wireless communication over radio frequencies (e.g., NFC, Bluetooth, WiFi, etc.), mobile communication device frequencies, or optically using visible or non-visible light. Those skilled in the art will appreciate that many other communications methods are also possible without departing from the teachings of the present disclosure. Furthermore, processor 608 need not be specifically dedicated to DTC system 600. Devices that can be used to supply processor 608 are ubiquitous throughout modern society. These devices include pre-existing processors in vehicles (often referred to as electronic control units, engine control units, or "ECUs"), mobile smartphones, tablet computing devices and many other devices that can be programmed to be used in conjunction with a vehicle or by an operator of a vehicle may be used in lieu of a dedicated processor.

Processor 608 employs DTC software 612 to analyze inputs relevant to implement the methods disclosed herein. DTC software 612, stored in physical memory 616 and in operative communication with processor 608, can execute any of a wide variety of analytical operations using inputs in furtherance of various aspects of the invention. Furthermore, as also described previously, DTC software 612 can include on-board location database 628 and/or travel-route database 632 and/or lane-level data.

It should be understood that, while on-board location database 628 and travel-route database 632 are specifically mentioned above, other databases (not shown) can be used to perform other or related functions. Exemplary applications of DTC system 600 May include avoidance of pedestrian-pedestrian conflicts, and pedestrian-motorized vehicle conflicts, in zones that can have unrestricted access (e.g., a public road intersection) or in zones that have restricted access (e.g., pedestrian zone, bike path, parking lot, etc.). For example, these databases can include a building floor plan, a manufacturing-facility or warehouse layout, a map of a city that also includes pedestrian walkways and bike paths (defining vehicle-free zones), and air-routes specified by altitude and geospatial coordinates. Those skilled in the art will appreciate that many other examples of databases can be used in connection with DTC software 612 to enhance the functionality of the system.

As mentioned above, physical memory 616 stores DTC software 612 and any necessary desired database, such as on-board location database 628, and travel-route database 632, and/or other information, and is in operative communication with processor 608. As is well known in the art, physical memory 616 can include, for example, flash memory, magnetic memory, optical memory, and other types of memory known in the art, and any combination thereof for storing non-transitory signals. Those skilled in the art will appreciate the wide variety of techniques that can be used to store DTC software 612 and other information in physical memory.

User interface 620 is in operative communication with processor 608 and can be designed and configured, for example, to communicate traffic signal indications to a human or autonomous operator of a vehicle needed to comply with the VTL method. In some examples, user interface 620 is a display capable of displaying red, amber, and green lights in response to an appropriate DTC signal, thereby providing traffic control instructions to the operator of a vehicle that are analogous to instructions provided by a conventional infrastructure-based traffic signals, and therefore familiar to vehicle operators. As mentioned above, instructions can also be provided by user interface 620 of a mobile communications device and can be symbolic (e.g., the in-vehicle traffic light), spoken (e.g., through the speaker unit of a mobile communications device, GPS unit, or in-vehicle sound system), graphically displayed (e.g., a dedicated in-vehicle display, a generic in-vehicle display, a heads-up display or projection, or a mobile communications device), or otherwise communicated. Those skilled in the art will appreciate the many types of devices that can function as user interface 620, in addition to those mentioned above. User interface 620 can also be used by DTC system 600 to solicit input from an operator (or occupant) of the vehicle, such as preferences and settings for the system or to provide additional information to inform processor 608 of any relevant information. The types of relevant information are described elsewhere in this disclosure, and are also apparent to those skilled in the art.

DTC system 600 may optionally include a vehicle interface 624 that can interact directly with the operative functionality of the vehicle, thereby automatically implementing VTL without the cooperation of a human vehicle operator. For example, vehicle interface 624 may, through operative connections to the various vehicle systems (e.g., propulsion, steering, braking, directional signal, etc.) direct the vehicle. For example, if the vehicle is required to decelerate or to stop at a given coordinate, vehicle interface 624 can interact with the propulsion and braking systems of the vehicle to conform to the instructions. This operative connection can be enabled through autonomous driving technology as illustrated, for example, in U.S. Patent Application Publication No. 2008/0243388 to Eguchi et al. While the teachings of the present disclosure can be used in concert with this and other related technologies, to automatically conform the vehicle's conduct, those skilled in the art will appreciate that other methods of placing vehicle interface 624 in communication with relevant vehicular systems may be available and used.

Vehicle interface 624 can also provide vehicle data and information to better inform system 600 in compliance with the VTL. For example, vehicle interface 624 can provide velocity, heading, vehicle type, acceleration (using an in-vehicle accelerometer), vehicle priority status, and other relevant information to processor 608. This information can then be used by processor 608 in cooperation with DTC software 612. Of course, as mentioned elsewhere in this disclosure, this information may also be communicated via V2V communications system 604 to another vehicle that has been selected as a VTL leader.

Figure 7:
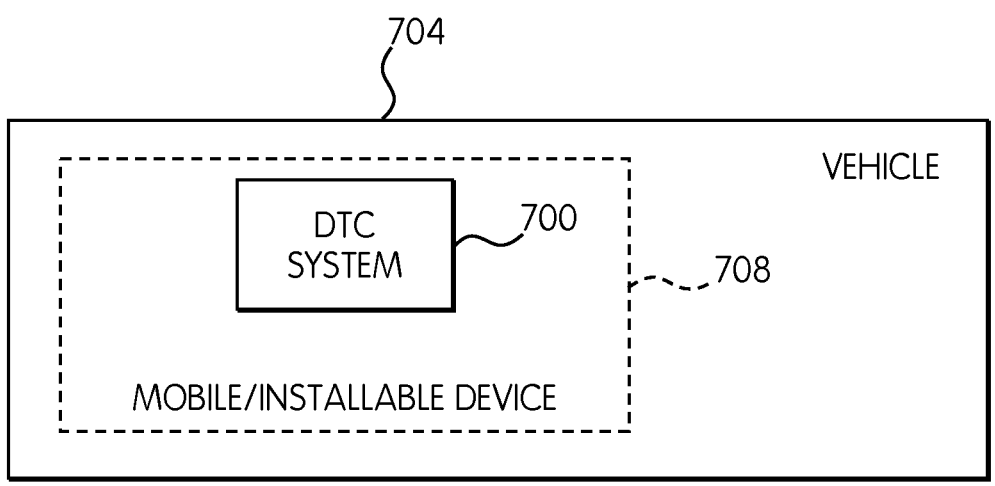
FIG. 7 is a high-level block diagram of a MSC operating on a mobile or installable device in a vehicle.

FIG. 7 illustrates an exemplary embodiment, in which a DTC system 700 is located on-board a vehicle 704, such as an automobile, and autonomous vehicle, a truck, a bus, a train, an aircraft, a flying car, a UAV, a drone etc. As described above, DTC system 700 can be integrated into vehicle 704 in any of a variety of ways, such as being installed as an after-market device or as an original equipment system. As those skilled in the art will readily be able to envision, when DTC system 700 contains some or all of the components of DTC system 600 of FIG. 6, those components can be contained largely or entirely within a single installed device or may alternatively be spread out throughout vehicle 704.

Alternatively, DTC system 700 of FIG. 7 can optionally be integrated into a mobile device 708 that can be placed on-board vehicle 704, for example, by the operator (not shown) of the vehicle 704. Examples of mobile devices that can be used for mobile device 708 include a smartphones, GPS units, personal multimedia devices, personal gaming devices, and tablet computing devices, among many other similar devices known to those skilled in the art, Details and examples pertinent to DTC system 700, mobile device 708, and vehicle 704, as well as the means, methods, and mechanisms by which they communicate and interact, are well known in the art, and need not be explained further for those skilled in the art to be able to execute the features and aspects disclosed in FIG. 7.

Figure 8:
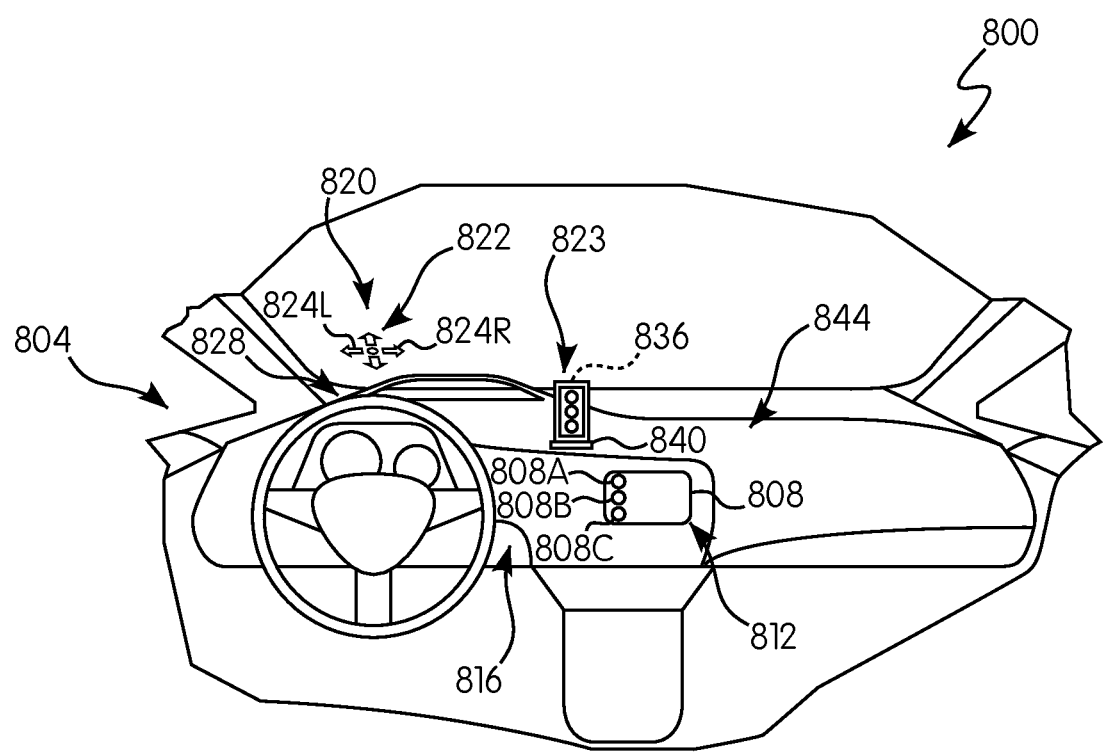
FIG. 8 shows a dashboard of a vehicle showing various options for displaying the traffic light indication.

FIG. 8 shows an exemplary dashboard region 800 of an automobile for containing a DTC system (not shown) of the present disclosure. Examples of DTC systems that can be implemented in automobile 804 include, but are not limited to, DTC systems 600 and 700 of FIG. 6 and FIG. 7, respectively, each of which can be configured to execute the method disclosed herein or similar VTL methods. FIG. 8 is provided to particularly illustrate various ways of instantiating a particular type of virtual traffic indication, specifically a virtual traffic signal that mimics a traditional infrastructure-type three-light traffic signal configured to implement conventional green, amber, and red phases of the control cycles. In one embodiment, a three-light virtual traffic signal 808 is displayed on a display 812 built into the dashboard 816 of automobile 804. Display 812 can be, for example, an existing touchscreen-type display for displaying, and/or allowing users to interact with other features of automobile 804, such as a sound system, climate-control system, backup-camera system and/or GPS, among others. In the example shown, virtual traffic signal 808 has three light positions 808A to 808C, for correspondingly displaying a red light, an amber light, and a green light in accordance with the U.S. standard arrangement of colors/phases. Even more particularly, FIG. 8 may illustrate a red light, i.e., position 808A, as being illuminated, indicating that the DTC system is instructing display 812 to instruct the vehicle operator that automobile 804 is subject to the red phase of the traffic control cycle, meaning that the automobile should either come to a stop or remain stopped, depending on the state of the automobile at the time of illumination of red phase. When position 808A is illuminated, positions 808B and 808C are not illuminated, signifying that the corresponding signal phases are not active.

Vehicle 804 may additionally or alternatively be outfitted with a heads-up display (HUD) 820 that displays another three-light virtual traffic signal 822 that can be the same as virtual traffic signal 808 displayed on built-in display 812. As those skilled in the art will readily appreciate, the vehicle operator may have the ability to turn on and off HUD 820 as desired. If automobile 804 includes both virtual traffic signals 808, 822, turning on HUD 820 may turn off traffic signal 808, or not. In this example, HUD 820 also includes directional signals 824L and 824R, which can be controlled by the DTC system aboard automobile 804, as described above in connection with vehicle interface 624 of DTC system 600 of FIG. 6. Although not shown, those skilled in the art will understand that another possible location for a virtual traffic signal is in the instrument panel region 828.

As an alternative to built-in display 812 and HUD 816, a virtual traffic signal 832 can be displayed on a mobile device 836, which in this example, is docked in a corresponding dock 840, which may be an aftermarket feature or an original equipment feature secured to or otherwise connected to the dashboard cover 844 of automobile 804. Mobile device 836 can be any suitable device that a user can readily remove from dock 840 and carry away from automobile it 04, such as a smartphone personal multi-media device (e.g., an iPod® device), personal gaming device, tablet computing device. GPS unit, etc. In one embodiment, mobile device 836 is in operative communication with the DTC system on board automobile 804 either wirelessly (e.g., via a Bluetooth radio) or via a wired connection (e.g., via dock 840 having a suitable connector). In another embodiment, mobile device 836 itself contains the DTC system, for example in the manner of mobile device 708 of FIG. 7. In that embodiment, automobile 804 need not have any components of a DTC system. As also explained above, other methods of communicating the instructions to the operator or directly to the vehicle are possible.

Figure 9:
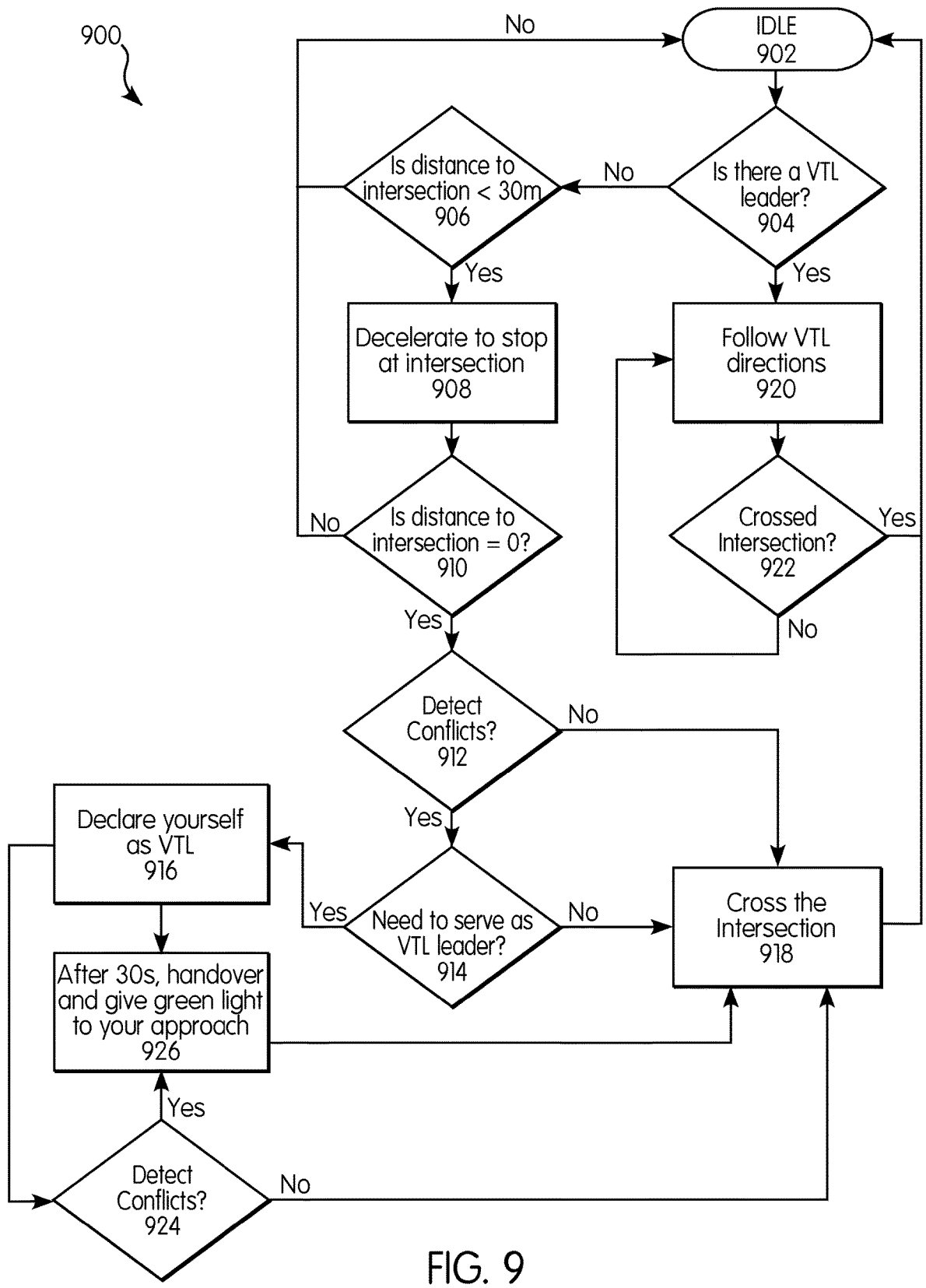
FIG. 9 is a flow chart of the operation of a preferred embodiment of the invention.

FIG. 9 is a flowchart showing the method 900 implemented in the vehicle for complying with VTL. The method could be embodied in DTC software 612, shown in FIG. 6 and executed by processor 608. In alternate embodiments, the method could be embodied in DTC system 700 executed by a mobile or installable device 708 as shown in FIG. 7.

At 902, the system is idle and waiting to detect a VTL leader or to approach an intersection. At 904, it is determined whether or not a VTL leader is present. If no VTL leader is present, this could indicate that the vehicle is approaching an intersection having no selected VTL leader, or it could indicate that the vehicle is not near an intersection. At 906, the method determines if the vehicle is within a predetermined distance of an intersection, and, if not, the method returns to the idle state at 902. In some embodiments of the invention, the predetermined distance would be set to, for example, 30 m.

If it is determined at 906 that the vehicle is within the predetermined distance of an intersection, control proceeds to 908, where the vehicle is instructed to decelerate in anticipation of a stop at the intersection. A yellow light indicator may be displayed in the vehicle. At 910 it is determined if the vehicle is at the intersection. If the vehicle is not yet at the intersection control returns to the idle state at 902 and the process continues through 904, 906 and 908 until it is determined that the vehicle is either at the intersection or that a VTL leader has been detected at 904 while the vehicle was approaching the intersection.

At 912 the method determines if any conflicts have been detected. Detected conflicts would be indicated by the receipt of a beacon packet from any other vehicle as the vehicle approached the intersection. At 914 the method determines if the vehicle needs to serve as the VTL leader. The vehicle would need to serve as a VTL leader if no other vehicles present at the intersection have been declared the VTL leader. If, at 914, the vehicle needs to serve as the VTL leader, the vehicle declares itself to be the VTL leader at 916. The vehicle would then display a red light indication within the vehicle and would broadcast beacon packets to all other vehicles indicating that it is now the VTL leader. Vehicles traveling in the opposite direction would also display a red light indication, while vehicles traveling in directions orthogonal to the direction of travel of the VTL leader would display a green light indication.

Vehicles may exchange additional information via beacon packets after a lead vehicle has been determined that may be useful in various other embodiments of the invention, for example, distance, speed, acceleration, the number of vehicles in a cluster (i.e., the number of vehicles that are following the vehicle which will arrive at the intersection first travelling in a given direction), etc. As an example of how such information may be used, in certain embodiments, if a vehicle arrives at an intersection and declares itself as the lead vehicle, it may realize that the number of vehicles in its own cluster is greater than the number of vehicles in the cluster of a vehicle approaching in an orthogonal direction. In such cases, the lead vehicle may immediately yield the leadership to a vehicle travelling in an orthogonal direction, with the goal of minimizing the average overall wait time at an intersection. In certain cases, the ratio of vehicles in each cluster may be used as a threshold to determine when to yield the leadership. This additional information may have additional uses in other embodiments.

At 912, if no additional beacon packets are received, after a short period of time, the vehicle may yield the VTL leadership, display a green light indication and proceed to cross the intersection at 918. Likewise, if at 914 the vehicle determines that it is not necessary for it to serve as the VTL leader (meaning that another vehicle has declared itself to be the VTL leader) the vehicle displays a green light indication and crosses the intersection at 918. Note at this point there is no vehicle acting as the VTL leader at the intersection.

At 904, if the vehicle detects beacon packets indicating that a VTL leader exists at the intersection, the vehicle receives traffic and control instructions from the VTL leader at 920. In accordance with the method of the present invention, the VTL leader always has a red light indication, although in other embodiments, other assumptions could be made. Vehicles traveling in the direction opposite the VTL leader will also display a red light indication, while vehicles traveling in directions orthogonal to the direction of travel of the VTL leader will display a green light indication. The vehicles following the VTL leader's directions at 920 having a green light indication are able to cross the intersection at 922, while those having a red light indication are not able to cross and must return to 920. The vehicle, after crossing the intersection at 918 then returns to idle at 902.

At 916 once a vehicle has declared itself is a VTL leader, it checks for conflicts, which would indicate other vehicles are approaching or passing through the intersection. Conflicts are detected by the receipt of beacon packets from other vehicles. If no conflicts are detected, which means that other vehicles have cleared the intersection, the VTL leader may wait for a predetermined short period of time before yielding the VTL leadership, displaying a green light indication and proceeding to cross the intersection 918. In preferred embodiments of the invention, the predetermined short period of time may be on the order of 1 to 2 seconds.

If conflicts are detected, the vehicle, at 926, will wait for a predetermined amount of time, for example, 30 seconds, after which the VTL leadership will be yielded to a vehicle approaching the intersection from an orthogonal direction. The former VTL leader, and any vehicles approaching the intersection from the same or opposite directions will then display the green light indication, while the new VTL leader, and any vehicles approaching the intersection from the same or opposite directions will then display a red light indication. If no conflicts are detected at 924, the VTL leader yields the VTL leadership and crosses the intersection at 918. Note that at this point no vehicle is VTL leader for this intersection.

In terms of performance, the method described herein for implementing the VTL under non-ideal conditions exploits the presence of stopped vehicles at intersections to serve in a natural way as the VTL leader. It is therefore clear that, during heavy traffic flows (e.g., during rush hours), the steady-state behavior of the invented method will be excellent. This shows that the use of the invented method during heavy traffic flows will be close to optimum, if not optimum.

Even when one does not have heavy traffic flows, the performance of the invented method will be comparable to existing traffic control systems which employ infrastructure-based traffic lights. This is due to the fact that, in the case where a vehicle does not receive a VTL message, it decides to decelerate and eventually stop at the intersection. If, after coming to a full stop at the intersection, the vehicle does not detect beacon messages from the orthogonal direction, after a short pause (e.g., 3 seconds) it crosses the intersection. This mechanism represents an improvement over infrastructure-based traffic lights in that it eliminates the frustrating situation which a vehicle is stopped at an intersection awaiting traffic at a time, a lot of traffic is traversing the intersection in the orthogonal directions.

Figure 10:
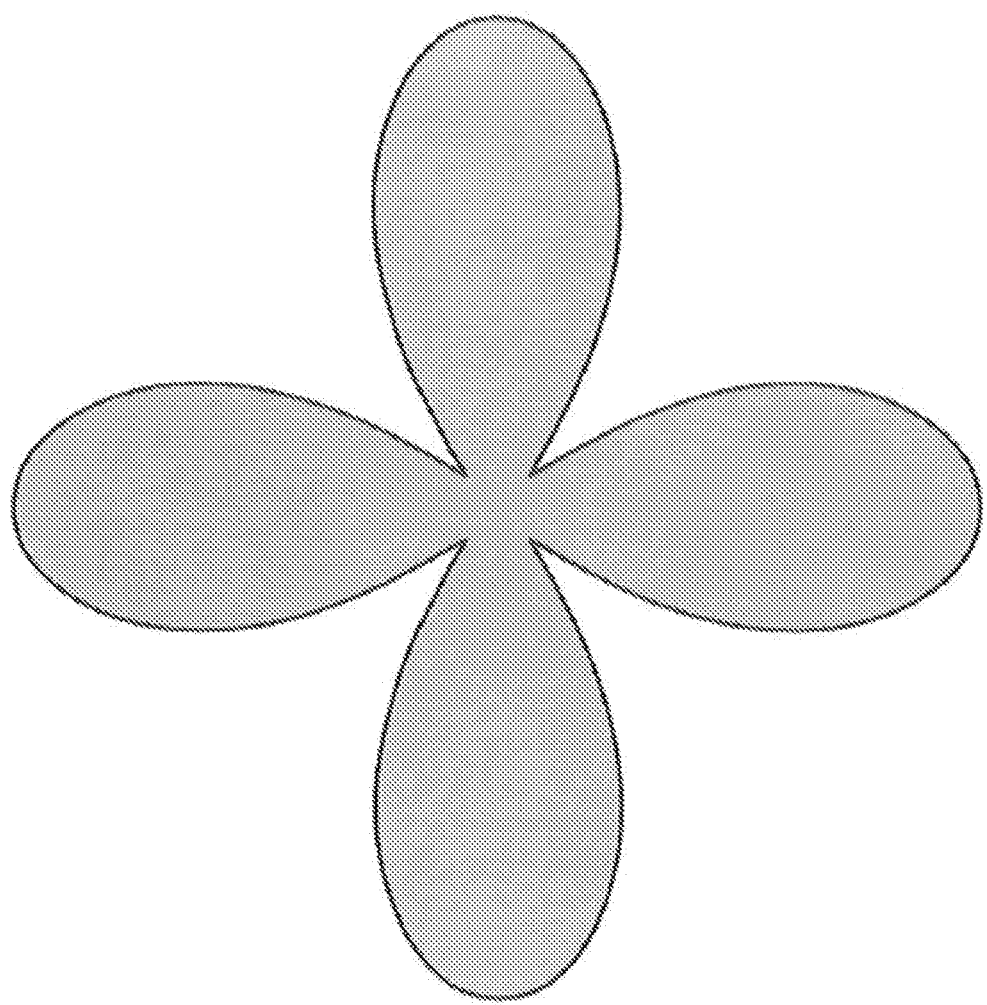
FIG. 10 shows the radiation pattern for a directional antenna used in various embodiments of the invention.

In one embodiment, the disclosed invention uses directional antennas having a radiation pattern shown in FIG. 10, to provide an embodiment providing regularity in terms of wireless transmission, reception, VTL Leader formation, etc. In other words, the use of directional antennas ensures that a vehicle A will only be able to communicate with a vehicle B in the orthogonal direction if the vehicle B is stopped at an intersection and is the closest vehicle to the intersection in the orthogonal direction in its own approach, thus serving as the VTL Leader. If this is not the case and vehicle B is not stopped at the intersection but is somewhere along the block moving towards the intersection, then vehicles A and B may not be able to communicate due to obstructions, in which case vehicle A will decelerate to stop. This way, several other cases of potential communications between vehicles A and B and other vehicles approaching the intersection and the complexity of decision making under such circumstances can be avoided. The use of the directional antenna nullifies the transmission of beacon messages to vehicles in the orthogonal approach from vehicles which are not at an intersection (i.e., they are somewhere in the block between two intersections).

When a vehicle is in between two intersections, the use of a directional antenna, ensures that the beacon messages sent by the vehicle are emitted in the horizontal direction in a useful manner. At the intersection, the radiation pattern depicted in FIG. 10 reaches in a direction along a longitudinal line passing through the vehicle and along a line orthogonal to the longitudinal line passing through the vehicle. Thus, vehicles in the orthogonal approach will not receive signals until the vehicle arrives at the intersection. This enables a simple and easy-to-implement algorithm and system design.

In another preferred embodiment, it is possible to use standard DSRC radios with omnidirectional antennas where the radiation pattern is 360 degrees. In such cases, the performance of the method of the present invention will be affected by the presence or absence of obstructions at the corners of that intersection. If, for example, there are no buildings, trees, high-rises, or other obstructions at the corner of the intersection, then line of sight conditions will prevail which implies that the vehicles A and B will be able to communicate regardless of the coordinates of the locations of A and B. This might render VTL Leader selection somewhat more complex but still possible. With this embodiment, conflicts between competing flows and leader selection for the VTL algorithm can be managed purely at the software level. It is clear that the main advantage of this embodiment will be low cost and off-the-shelf nature of the hardware used.

Different embodiments of the method of the present invention in terms of signaling format are clearly possible. The current DSRC or 802.11p standard supports both safety and non-safety applications. The signaling and framing of beacon messages follow a TDMA/FDMA scheme where in a 100 ms packet sent by a DSRC radio 46 ms is devoted to sending a safety message while another 46 ms can be used for non-safety applications (e.g., traffic efficiency). In addition to these two portions there are two 4 ms guard bands. As a preferred embodiment, the method of the present invention can simply use this signaling/framing structure whereby a given vehicle X sends its beacon messages during the 46 ms allocated for safety applications while it listens to possible VTL messages in the other 46 ms portion dedicated for non-safety applications. Clearly, this would be a very efficient embodiment of the disclosed invention. It should be obvious, however, that other embodiments where the beacon messages and VTL messages are sent on different frequency channels are also possible (DSRC standard 802.11p provides a control channel and 6 service channels at different frequencies).

This invention addresses the potential V2V communications problem that could be an issue and concern in implementing the VTL technology due to obstructions at the corners of intersections (buildings, trees, high-rises, etc.). By exploiting the presence of stopped vehicles at intersections, the disclosed invention provides a practical method and system for solving the underlying V2V communications problem which is absolutely essential for the proper operation of the VTL scheme. While solving the communications problem in the VTL scheme with a very unconventional and original technique, to make sure that the critical safety requirements are also met, the invented system forces a vehicle to stop at an intersection when it does not receive any VTL messages. This crucial step is absolutely necessary for a fail-safe operation. This way, it is guaranteed that no accidents or dangerous situations will happen. Hence, the invented scheme is 100% safe. Of course, this forced stopping and the associated guaranteed safety comes at the expense of a slight degradation in terms of the benefit the original VTL was reported to have with respect to a system with infrastructure-based traffic lights. While the original VTL can reduce the commute time during rush hours by about 40%, the invented new scheme has a maximum benefit of about 23%. In this sense, the disclosed invention is an excellent tradeoff between safety and efficiency.

While at a first glance the disclosed invention might look similar to a "4-way stop sign" approach, it should be clear that it is very different in the sense that when there is a VTL leader, the method allows a group or cluster of vehicles in the orthogonal direction to cross the intersection as opposed to a one-by-one crossing typically experienced in 4-way stop sign scenarios.

While the method of the present invention is effective in a stand-alone implementation, it should also be realized that the method of the present invention may also optionally be used in conjunction with the ideal VTL method set forth in U.S. Pat. No. 8,972,159, in which the method of the present invention would be used at some intersections, and the ideal VTL method described in the patent would be used at other intersections. This is desirable because not all intersections will have obstructions which disrupt vehicle-to-vehicle communication and, in such cases, is desirable to allow the vehicle to take advantage of the improvements and flow offered by the ideal VTL method. In such a case, it would be necessary to provide a database containing information regarding each intersection informing the system weather the intersection follows the ideal VTL method discussed in U.S. Pat. No. 8,972,159, or the non-ideal VTL method disclosed herein. Alternatively, the intersection could have installed a beacon which informs approaching vehicles which algorithm to use at the intersection.

To those skilled in the art to which the invention relates, many modifications and adaptations of the invention will suggest themselves. Implementations provided herein, including implementations using various components or arrangements of components should be considered exemplary only and are not meant to limit the invention in any way. As one of skill in the art would realize, many variations on implementations discussed herein which fall within the scope of the invention are possible. Accordingly, the exemplary methods and apparatuses disclosed herein are not to be taken as limitations on the invention, but as an illustration thereof. Additionally, it should also be realized that the invention is not limited to on road vehicles, but may be implemented with respect to many other types of vehicles, including, for example, vehicles used at an airport or sea port for carrying passengers, food, luggage, etc., vehicles used in military camps or warehouses, aircraft, including unmanned and/or autonomous drones, seacraft, railroads, transit lines, etc. additionally, it should also be realized that the invention is not only applicable to human operated vehicles, but may also be used to inform autonomous control systems for any type of vehicles.

We claim:

1. A method implemented on a computer in a vehicle for providing virtual traffic lights comprising:
    arriving at an intersection;
    receiving, after arriving at the intersection, via a vehicle-to-vehicle communication system, one or more beacon packets indicating that conflicting traffic is approaching the intersection;
    determining that no virtual traffic signal has been established at the intersection, based on having received no beacon packets via the vehicle-to-vehicle communication system from other vehicles acting as lead vehicle;
    declaring itself as the lead vehicle without input regarding the lead vehicle decision from the conflicting traffic approaching the intersection;
    establishing the virtual traffic signal at the intersection; and
    broadcasting, via the vehicle-to-vehicle communication system, a beacon packet alerting other vehicles that the vehicle is the lead vehicle and that a virtual traffic signal has been established for the intersection.

2. The method of claim 1 further comprising:
    displaying a red light indication in the vehicle.

3. The method of claim 1 wherein the beacon packets broadcast by the lead vehicle comprise at least the geographic position of the lead vehicle and an indication of which virtual traffic light to display.

4. The method of claim 1 further comprising:
    receiving an information packet from a beacon, before arriving at the intersection, indicating that the intersection complies with the method, and, if so, executing the steps of the method, otherwise, using a different algorithm for collision avoidance at the intersection.

5. The method of claim 1 wherein the vehicle is the lead vehicle, further comprising:
- determining that no other vehicles remain at or near the intersection traveling in a direction orthogonal to the vehicle;
- yielding the leadership; and
- displaying a green light indication in the vehicle.

6. The method of claim 1 wherein the vehicle is the lead vehicle, further comprising:
- waiting for a predetermined period of time;
- yielding the leadership to one of the other vehicles traveling in a direction orthogonal to the direction of travel of the vehicle; and
- displaying a green light indication in the vehicle.

7. The method of claim 1 wherein one or more vehicles at the intersection are leaders of a cluster of vehicles.

8. The method of claim 7 wherein the cluster of vehicles comprises the cluster leader and all vehicles following the cluster leader and traveling in the same direction as the cluster leader.

9. The method of claim 8 wherein vehicles in the cluster following the cluster leader display the same traffic light indication as the cluster leader.

10. The method of claim 7 wherein the lead vehicle yields leadership to a vehicle travelling in an orthogonal direction.

11. The method of claim 1 wherein beacon packets exchanged via the vehicle-to-vehicle communication system are transmitted via a directional antenna oriented such as to transmit and receive signals in a direction along a longitudinal line passing through the vehicle and along a line orthogonal to the longitudinal line passing through the vehicle.

12. A system in a vehicle for providing virtual traffic lights comprising:
- a vehicle-to-vehicle communication system configured to exchange information between the vehicle and other vehicles;
- a display configured to display status of the virtual traffic lights;
- a processor; and
- software, executing on the processor, the software performing the functions of:
  - receiving, via the vehicle-to-vehicle communication system, one or more beacon packets, after arriving at the intersection, indicating that conflicting traffic is approaching intersection;
  - determining, after arriving at the intersection, that no virtual traffic signal has been established at the intersection, based on having received no beacon packets via the vehicle-to-vehicle communication system from other vehicles acting as lead vehicle;
  - declaring itself as the lead vehicle without input regarding the lead vehicle decision from the conflicting traffic approaching the intersection;
  - establishing the virtual traffic signal at the intersection; and
  - broadcasting, via the vehicle-to-vehicle communication system, a beacon packet alerting other vehicles that the vehicle is the lead vehicle and that a virtual traffic signal has been established for the intersection.

13. The system of claim 12 wherein the vehicle-to-vehicle communication system comprises:
- a DSRC radio configured to broadcast beacon packets to other vehicles and configured to receive beacon packets from other vehicles.

14. The system of claim 12 wherein the display is selected from a group comprising a display screen installed as part of a vehicle control system, a heads-up display, a separate display and a display of a smart phone or tablet device.

15. The system of claim 12 wherein the processor, the software and the display are part of a smartphone or tablet computing device.

16. The system of claim 15 further comprising a communication link between the smartphone or tablet computing device and the vehicle-to-vehicle communication system.

17. The system of claim 16 further comprising:
- a source of GPS information.

18. The system of claim 13 further comprising:
- a directional antenna coupled to the vehicle-to-vehicle communication system wherein the directional antenna is oriented such as to transmit and receive signals in a direction along a longitudinal line passing through the vehicle and along a line orthogonal to the longitudinal line passing through the vehicle.

19. The system of claim 12, the software performing the further function of:
- displaying a red light indication in the vehicle when the vehicle is the lead vehicle.

* * * * *